(12) United States Patent
Sørensen et al.

(10) Patent No.: US 7,179,059 B2
(45) Date of Patent: Feb. 20, 2007

(54) BLADE FOR A WIND TURBINE AND A METHOD OF ASSEMBLING LAMINATED PROFILES FOR A BLADE

(75) Inventors: Flemming Sørensen, Svendborg (DK); Rune Schytt-Nielsen, Them (DK)

(73) Assignee: SSP Technology A/S, Broby (DK)

( * ) Notice: Subject to any disclaimer, the term of this patent is extended or adjusted under 35 U.S.C. 154(b) by 65 days.

(21) Appl. No.: 10/511,095

(22) PCT Filed: Apr. 8, 2003

(86) PCT No.: PCT/DK03/00225

§ 371 (c)(1), (2), (4) Date: Jun. 13, 2005

(87) PCT Pub. No.: WO03/087572

PCT Pub. Date: Oct. 23, 2003

(65) Prior Publication Data

US 2005/0214122 A1    Sep. 29, 2005

(30) Foreign Application Priority Data

Apr. 15, 2002  (DK) ............................... 2002 00557

(51) Int. Cl.
*F03D 1/06* (2006.01)
(52) U.S. Cl. ..................... 416/226; 416/233
(58) Field of Classification Search ................ 416/224, 416/226, 233
See application file for complete search history.

(56) References Cited

U.S. PATENT DOCUMENTS 4,305,699 A    12/1981   Martinelli
4,732,542 A *   3/1988   Hahn et al. .................. 416/226

FOREIGN PATENT DOCUMENTS

DK       172126      11/1997

*Primary Examiner*—Edward K. Look
*Assistant Examiner*—Nathan Wiehe
(74) *Attorney, Agent, or Firm*—Sughrue Mion, PLLC

(57) ABSTRACT

The invention relates to a blade for use on a wind turbine and a method of assembling laminated profiles (3, 5) for a blade for a wind turbine. The development towards increasingly larger blades requires, that the technology of manufacture is reviewed and novel methods applied, in particular with regard to aspects regarding strength and weight. It is an object of the invention to provide a blade that can be manufactured more accurately and with large uniformity with regard to strength, from blade to blade, and which is lighter than prior art blades. Novel aspects of the invention regards that the wing comprises a beam part (2) which comprises at least a first part (4) and at least a second part (6), said first part (4) comprising at least one body part (12) connected to at least one assembly face (10) and to at least one abutment flange (14) said second part (6) comprising at least one body part (18) connected to at least one assembly face (16) and to at least one abutment flange (20); wherein the parts (4, 6) are adjusted by use of means for height adjustment (8) and connected to each other at the assembly faces (10, 16); and wherein the laminated profiles (3, 5) are assembled around the beam part (2) and glued against respective abutment flanges (14, 20). Hereby it is obtained that the height of the beam part can be adjusted in accordance with the thickness of the laminated profiles, such that the glued joint reaches the desired thickness, thereby an amount of glue is saved, since extra dosage is avoided, whereby the blade becomes less expensive and lighter.

* cited by examiner

10 Claims, 2 Drawing Sheets

BLADE FOR A WIND TURBINE AND A METHOD OF ASSEMBLING LAMINATED PROFILES FOR A BLADE

The invention relates to a blade for use on a wind turbine, said blade being of the type that essentially comprises at least two separately manufactured fibre-reinforced laminated profiles and at least one longitudinally extending beam portion. The invention also relates to a method of assembling laminated profiles for a blade for a wind turbine.

Blade profiles/blades are already known that are built essentially from two laminated profiles that are assembled by means of gluing, and inside of which there is located a carrier beam that can be one or more metal profiles or a wound GRP profile onto which the laminated profiles are also glued.

Those aides of the laminated profiles that are to be glued to the carrier beam are constituted of hand-laid inner sides that are not machined, for the sake of price and practicalities, and therefore they comprise considerable inaccuracies. Furthermore a large number of moulds are usually employed for the manufacture of the halves, said halves being at a later point in time combined randomly, thereby further increasing the inaccuracies. Therefore due regard is to be taken to the entire number of tolerances—both on moulds, thickness of laminated profiles and height of carrier beam. Thus, there is a risk that the laminated profiles become thickest while simultaneously the carrier beam is highest.

In practice it is hence necessary to adapt the dimensions of the parts to the largest sum of tolerances, which means that usually there is a large gap between the laminated profiles and the carrier beam. This gap is to be taken up by the glued joint, which is particularly critical in those cases where the carrier beam is essentially to carry the forces as opposed to the laminated profiles carrying; and wherein the demands to the strength of the glued joint are the highest. The strength and longevity of the glued joint are moreover influenced by the thickness of the glued joint it is moreover a quality assurance aspect as the glued joint is concealed under the laminated profiles and hence difficult to check. In order to be sure that there is sufficient glue to fill the gap, it is necessary to dose an excess amount of glue, which increases the weight of the blade and is an additional cost, the glue being a relatively expensive resource, and thick glued joints have a considerably decreased strength and life. The larger the blades are, the larger is the problem, which is unfortunate. The development towards increasingly large blades require that the technology of manufacture is reviewed and new methods applied, in particular with regard to aspects relating to strength and weight. When viewing a blade that can have a length of more than 30 m and a width of several meters, a gap of 15 mm does not seem important, but it may actually involve a large extra consumption of glue, which constitutes a significant additional cost. Those 15 mm multiplied by the width of the carrier beam multiplied by the length of the carrier beam yields a rather large volume. In case of blades of 70 m the gap and the extra consumption of glue becomes extremely significant.

It is an object of the invention to provide a blade that can be manufactured more accurately and with an increased uniformity with regard to strength from blade to blade compared to prior art blades. It is a further object of the invention to achieve a blade construction which is lighter and less expensive than prior art blades. Further objects are to provide a method of assembling laminated profiles that is more accurate than the prior art methods and which result in savings of glue during assembly of the blade.

Novel and characterising aspects of the invention comprise that the beam part comprises at least one first part and at least one second part, said first part comprising at least one body part connected to at least one assembly face and to at least one abutment flange, wherein the parts are adjusted with means for height adjustment and connected to each other at the assembly faces, and wherein the laminated profiles are assembled around the beam part and glued to the respective abutment flanges.

From the characterising aspects several advantages are obtained, including that the height of the bam part can be adapted to the thickness of the laminated profiles, such that the glued joint obtains the desired thickness. Hereby an amount of glue is saved, since extra dosage is avoided, thereby making the blade less expensive and lighter. The beam part being at the beginning divided into at least two parts, these two parts are considerably less rigid than the final beam part. Thereby they are flexible enough to be adjusted differently along the beam part, such that differences in thickness of the laminated profiles across their length can also be absorbed. As a side effect it is also obtained that, when the blade becomes lighter, the load on the bearing of the blade becomes smaller.

Each of the parts may comprise two parallel body parts, which body parts are at their one end connected to an essentially transversally extending abutment flange, and at their other end connected to a transversally extending flange, which flanges comprise assembly faces. Hereby it is obtained that, when the parts are joined, they combine to form an essentially closed cross section that provides a high degree of rigidity, including a high degree of bending and torsional stiffness. Due to the transversal flanges, it is further obtained that the assembly faces become wide and are readily assembled in a strong a durable manner.

Means for height adjustment includes glue, which is appropriate in those cases, where the gap has been reduced so much by care that the necessary height adjustment is considerably reduced.

Means for height adjustment includes eg screws, spacer elements, interlayers or the like, whereby it is easy and expedient to perform the adjustment and it can be done accurately. Besides, it is obtained that the adjustment can be performed differently over the length of the beam part.

The beam part may comprise at least one assembly panel that overlaps the body parts and are connected to both parts. Thereby it pan be avoided that excess glue from the joint between the assembly faces enter and become located in beam part and adds superfluous weight. Besides, the assembly panel contributes to guide the parts towards each other during their assembly. Moreover the assembly panel increases the strength of the assembly since the glue area is increased and glued portions are provided which are able to be situated more or less perpendicular to each other.

The assembly panel can be T-shaped thereby enabling it to simultaneously constitute a spacer element for height adjustment between the assembly faces.

The invention also comprises a method of assembling laminated profiles for a blade for a wind turbine, said blade being of the type that essentially comprises at least two separately manufactured fibre-reinforced laminated profiles and at least one longitudinally extending beam part.

Novel and characterising aspects of the method comprises that the beam part comprises at least one first part and at least one second part, said first part comprising at least one body part connected to at least one assembly face and to at least one abutment flange, said second part comprising at least one body part connected to at least one assembly face and to at least one abutment flange, where at least one of the parts is manufactured to be undersized, and where the total height of the parts is adjusted, after which the parts are connected, and where the laminated profiles are assembled around the beam part and glued towards the respective abutment flanges.

On the basis of the novel and characterising aspects of the invention it is obtained that the beam part can be adapted corresponding to the internal dimension between the contour of the inner sides of the laminated profiles, such that the glue joint between the laminated profiles and the respective abutment flanges becomes well-defined. Thereby glue is saved as extra dosage is avoided, thereby enabling lighter and less expensive blades and, likewise, the durability is improved.

The parts can be connected by gluing, which is an advantageous assembly procedure.

The parts can be laid in moulds with the abutment flanges facing towards the mould walls. Thereby the contour of the abutment flanges become very well-defined, which contributes to a strong and durable assembly with the laminated profiles. In return, the assembly faces become less accurate, but they will be situated where the height adjustment takes place, whereby the significance of the inaccuracy is more or less eliminated.

Each of the parts may comprise two parallel body parts, said body parts being at their one end connected to an essentially transversally extending abutment flange and, at its other end, it is connected to a transversally extending flange, said flanges comprising assembly faces, where, prior to assembly of the parts, two assembly panels are mounted, such that the assembly panels will, upon assembly of the parts, overlap the body parts, said assembly panels being connected to both parts. Thereby the assembly panels are caused to constitute structural elements in the beam part and the strength is increased. Besides, it becomes easier to control gluing of the assembly faces, as the assembly panels prevent excess glue from running into the beam part. Additionally, it becomes easier to guide the parts to their place in relation to each other, which is a relief in particular in case of very long beam parts for large blades.

The joints are preferably performed by gluing and subsequent hardening.

In the following, the invention will be described in further detail and exemplary embodiments will appear from the figures, wherein FIG. 1 is a cross sectional view of a blade for a wind turbine;

Figure 4:
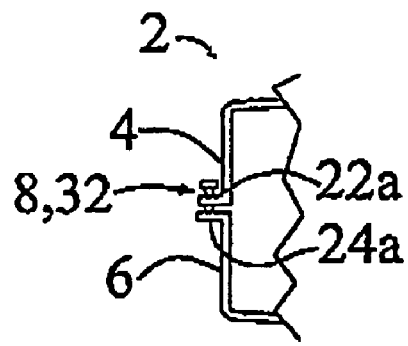
Figure 5:
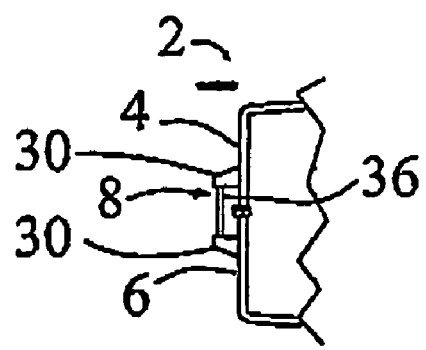
Figure 6:
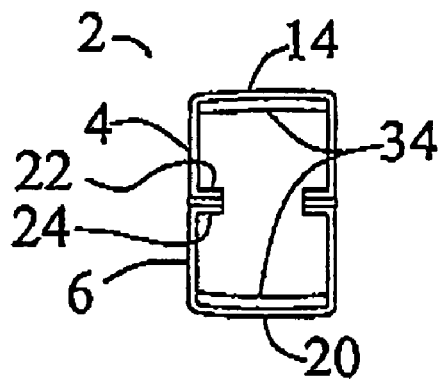
Figure 7:
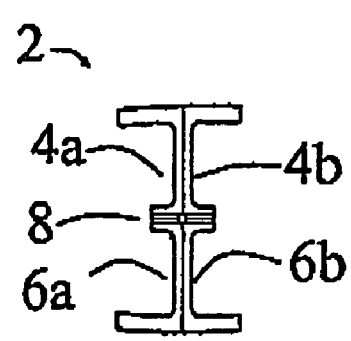
Figure 8:
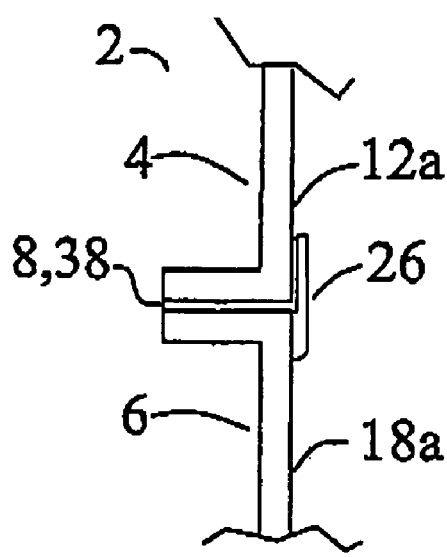
Figure 9:
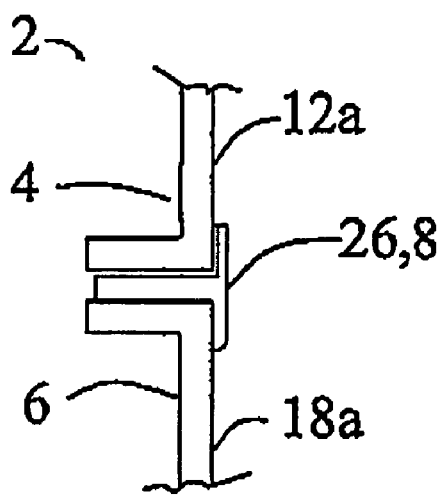

FIG. 4 is a partial view of a cross section of a beam part;
FIG. 5 is a partial view of a cross section of a beam part;
FIG. 6 is a cross sectional view of a beam part;
FIG. 7 is a cross sectional view of a beam part;
FIG. 8 is a partial view of a cross section of a beam part; and
FIG. 9 is a partial view of a cross section of a beam part.

Figure 1:
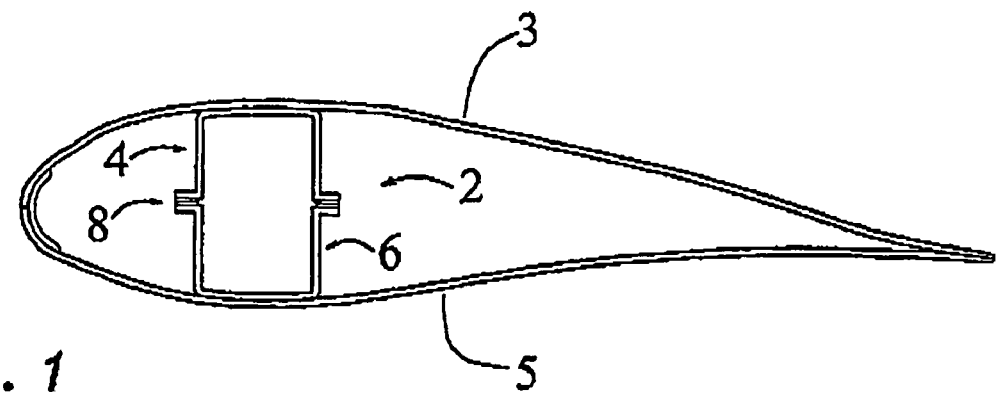

FIG. 1 shows a simplified cross sectional view of a blade for a wind turbine comprising two laminated profiles 3 and 5 that constitutes the aerodynamically active part of the blade within the blade is located a beam part 2 comprising a first part 4 and a second part 6. The total height of the beam part 2 can be adjusted by means for height adjustment 8. The laminated profiles 3 and 5 are connected to the beam part 2, preferably by gluing.

Figure 2:
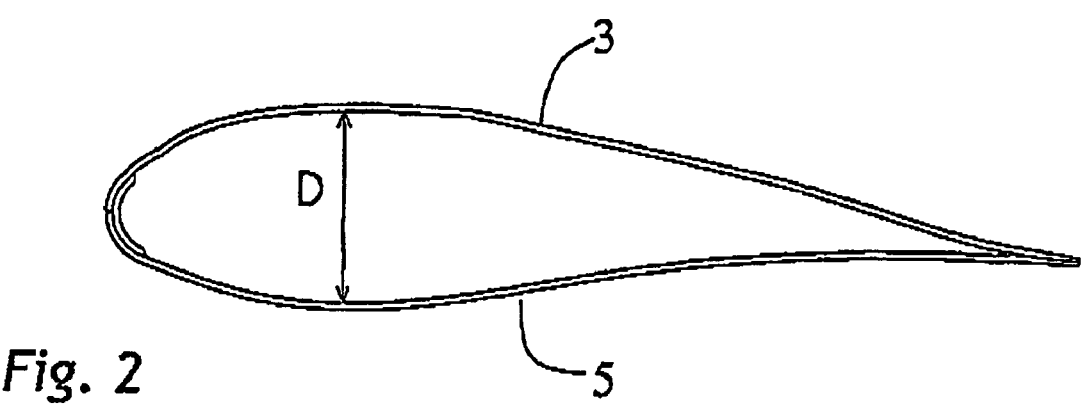
FIG. 2 shows two laminated profiles in cross sectional view.

FIG. 2 shows two laminated profiles 3 and 5 located in the position they are constructed for being located in. The laminated profiles 3 and 5 are manufactured by manually laying a fibre material and a binder, eg polyester or epoxy, in a mould whereby the outer side of the laminated profiles, cf. the in-use situation, faces towards the mould. Hereby the most accurate external contour is achieved, which is important to the yield of the wind turbine. The internal side of the laminated profiles is far from permanently defined as this is rendered impossible by differences and variation in ia the fibre material. Thereby the thickness is caused to vary considerably and consequently the dimension designated D in FIG. 2 will also vary. In the prior ar where a carrier beam is used of either and for example metal profiles or a wound GRP beam the amount of glue necessary for reaching from the inner side of the laminated profiles and to the carrier beam will differ because D varies. Thereby the thickness of the glue joint will vary. This means that, in many cases, a large amount of glue will be used, eg because the carrier beam can be considerably lower in height than D. The gap between the laminated profile and the beam is to be taken up by the glued joint, which is particularly critical in those cases where the carrier beam is essentially to carry the forces, as opposed to the laminated profiles carrying, and wherein the requirements to the strength of the glued joint are the highest. The strength and life of the glue joint are also influenced by the thickness of the glued joint.

Figure 3:
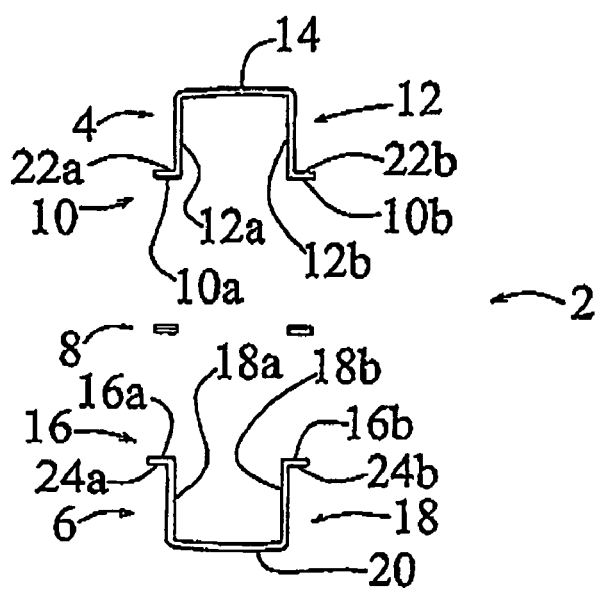
FIG. 3 is a cross sectional view of beam part in exploded view.

FIG. 3 shows an exploded view of a cross section of a beam part 2. The beam part 2 comprises at east a first part 4, at least a second part 6, and means for height adjustment 8, which first part 4 comprises at least one body portion 12 connected to at least one assembly face 10 and to at least one abutment flange 14, which second part 6 comprises at least one body portion 18 connected to at least one assembly face 16 and to at least one abutment flange 2 wherein the parts 4 and 6 are, at the assembly faces 10 and 16, adjustable by means of means for height adjustment 8. In the embodiment shown in FIG. 3, a first part 4 comprises two body parts 12a and 12b and is, at its first end, connected to a transversal abutment flange 14, and at the other end connected to transversal flanges 22a and 22b. On the side of the part 4 facing towards the second part 6, is located two assembly faces 10a and 10b. The assembly faces are located on the transversal flanges 22a and 22b. The second part 6 comprises two body parts 18a and 18b and is, at its one end connected to a transversal abutment flange 20 and, at the other end, it is connected to transversal flanges 24a and 24b. On the side of the part 6 that faces towards the first part 4, two assembly faces 16a and 16b are located. The assembly faces are located on the transversal flanges 24a and 24b. The parts 4 and 6 are preferably manufactured by laying up of fibre material and binder in moulds, where the abutment flanges 14 and 20 face towards the moulds. FIG. 3 shows means for height adjustment 8 shows as intermediate-layer plates. With a number of intermediate-layer plates of varying thickness, it is possible to adjust the distance until the beam part 2 reaches a height corresponding to the interior distance between two current laminated profiles, see FIGS. 1 and 2. In case of parts 4 and 6 that are not provided with transversal flanges 22a, 22b, 24a and 24b the assembly faces 10 and 16 will eg be the end of the body parts 12 and 18 that are not connected to the abutment flanges 14 and 20. In case of blade constructions, where the beam part 2 is to constitute an essential part of the strength and rigidity, the thickness of the abutment flanges 14 and 20 may be considerably larger than the thickness of body parts 12 and 18.

FIG. 4 shows a beam part 2 with two parts 4 and 6 that comprise transversal flanges 22a and 24a. Also shown are means for height adjustment 8 that comprise screws 32, which eg is placed in a nut (not shown) that may be embedded in the transversal flange 22a. Adjustment of the height of the beam part 2 can be achieved by adjusting the screw 32 that support/press on the flange 24a. When the desired height has been reached, for instance the first part 4 can be lifted upwards and clear of the other part 6, such that it is possible to apply glue for assembling the parts 4 and 6. Alternatively the interface between the parts 4 and 6 can be closed with fibre material and binder.

FIG. 5 shows yet another embodiment of means for height adjustment 8, wherein blocks 30 are secured on the side of the first part 4 and the side of the second part 6, and of which the uppermost block is provided with thread, in which thread a threaded bar 30 is provided by which it is possible to adjust the distance between the parts 4 and 6 and hence the height of the beam part 2.

FIG. 6 shows a beam part 2, where the bending stiffness is increased by insertion of an additional layer 34 of fibre material and binder internally on the abutment flanges 14 and 20. In this manner the rigidity can be increased in a simple manner, eg in case the blade is to be used under increased requirements to use. Moreover, the figures shows that the transversal flanges 22 and 24 can also face towards each other.

FIG. 7 shows a beam part 2 that comprises four parts 4a, 4b, 6a and 6b. The parts 4a and 4b and 6a and 6b, respectively can be joined separately in pairs. Alternatively the pairs 4a and b and 6a and 6b could be manufactured in one piece.

FIGS. 8 and 9 show sections of a beam part 2, where an assempy panel 26 is mounted. In FIG. 8 the assembly panel 26 is mounted on the body part 18a and cover the gap between the two parts 4 and 6. There is preferably a thin gap between the assembly panel 26 and the body part 12a, such that, during assembly of the parts 4 and 6, glue is also applied to the side of the assembly panel 26, which is thus secured on both parts and contributes to the strength. The distance between the parts 4 and 6 is suitable for means 8 for height adjustment to be constituted by glue 38. The assembly panel 26 moreover sees to it that excess glue does not run into and become deposited within the beam part 2. FIG. 9 shows a T-shaped assembly panel 26 wherein the strengthening function and the glue-stopping function are achieved in combination with a height-adjusting function, the one arm acting as intermediate layer. Of course, it is possible to use a number of T-shaped assembly panels of various thickness for the sake of the height-adjusting function.

The invention claimed is:

1. A blade for use on a wind turbine, said blade being of the type that essentially comprises at least two separately manufactured, fibre-reinforced laminated profiles (3, 5) and at least one longitudinally extending beam part (2), wherein the beam part (2) comprises at least one first part (4) and at least on second part (6), said first part (4) comprising at least one body part (12) connected to at least one assembly face (10) and at least one abutment flange (14), said second part (6) comprising at least one body part (18) connected to at least one assembly face (16) and to at least one abutment flange (20), wherein the parts (4, 6) are adjusted by means for height adjustment (8) and connected to each other at the assembly faces (10, 16), and wherein the laminated profiles (3, 5) are assembled around the beam part (2) and glued against respective abutment flanges (14, 20).

2. A blade according to claim 1, wherein each of the parts (4, 6) comprise two parallel body parts (12a, 12b, 18a, 18b), said body parts being at their one end connected to an essentially transversally extending abutment flange (14, 20) and at their other end connected to a transversally extending flange (22a, 22b, 24a, 24b), said flanges comprising assembly faces (10a, 10b, 16a, 16b).

3. A blade according to claim 1, wherein the means for height adjustment (8) comprises glue.

4. A blade according to claim 1, wherein the means for height adjustment (8) comprises screws, space elements, intermediate layers, or the like.

5. A blade according to claim 1, wherein the beam part (2) comprises at least one assembly panel (26) that overlaps the body parts (12, 18) and are connected to both parts (4, 6).

6. A blade according to claim 5, wherein the assembly panel (26) is T-shaped.

7. A method of assembling laminated profiles for a blade for a wind turbine, said blade being of the type that comprises at least two separately manufactured, fibre-reinforced laminated profiles (3, 5) and at least one longitudinally extending beam part (2), wherein the beam part (2) comprises at least a first part (4) and at least a second part (6), said first part (4) comprising at least one body part (12) connected to at least one assembly face (10) and at least one abutment flange (14), said second part (6) comprising at least one body part (18) connected to at least one assembly face (16) and to at least one abutment flange (20), wherein the method comprises the following steps:

manufacturing at least one of the parts (4, 6) to be undersized;

adjusting the total height of the parts (4, 6);

connecting the parts (4, 6); and assembling the laminated profiles (3, 5) around the beam part (2) and glued to the respective abutment flanges (14, 20).

8. A method according to claim 7, wherein the parts (4, 6) are connected by gluing.

9. A method according to claim 7, wherein the parts (4, 6) are laid in moulds with the abutment flanges (14, 20) facing the mould walls.

10. A method according to any on of claims claim 7, wherein each of the parts (4, 6) comprises two parallel body parts (12a, 12b, 18a, 18b), said body parts being at their one end connected to an essentially transversally extending abutment flange (14, 20) and at their other end connected to a transversally extending flange (22a, 22b, 24a, 24b), said flanges comprising assembly faces (10a, 11b, 16a, 16b), wherein prior to assembly of the parts (4, 6) in the assembly step, two assembly panels (26) are mounted, such that the assembly panels will, upon assembly of the parts, overlap the body parts (12a, 12b, 18a, 18b), said assembly panels (26) being connected to both parts (4, 6).

* * * * *